US008903441B2

(12) United States Patent
Kim et al.

(10) Patent No.: US 8,903,441 B2
(45) Date of Patent: Dec. 2, 2014

(54) GROUP RESOURCE ALLOCATION METHOD AND DEVICE IN WIRELESS ACCESS SYSTEM

(75) Inventors: Jeong Ki Kim, Anyang-si (KR); Youngsoo Yuk, Anyang-si (KR); Wook Bong Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 13/574,598

(22) PCT Filed: Feb. 23, 2011

(86) PCT No.: PCT/KR2011/001265
§ 371 (c)(1),
(2), (4) Date: Sep. 18, 2012

(87) PCT Pub. No.: WO2011/105809
PCT Pub. Date: Sep. 1, 2011

(65) Prior Publication Data
US 2013/0023296 A1  Jan. 24, 2013

Related U.S. Application Data

(60) Provisional application No. 61/330,900, filed on May 4, 2010, provisional application No. 61/307,859, filed on Feb. 25, 2010, provisional application No. 61/307,445, filed on Feb. 23, 2010.

(30) Foreign Application Priority Data

Feb. 23, 2011 (KR) .......................... 10-2011-0016076

(51) Int. Cl.
*H04W 72/04* (2009.01)
*H04W 72/12* (2009.01)
(Continued)

(52) U.S. Cl.
CPC .............. *H04W 72/121* (2013.01); *H04W 4/06* (2013.01); *H04W 72/042* (2013.01); *H04W*
(Continued)

(58) Field of Classification Search
CPC .. H04B 7/0413; H04B 7/0417; H04B 7/0421; H04B 7/0426; H04B 7/043; H04B 7/0452; H04L 5/0007; H04L 5/003; H04L 5/0091; H04L 5/00; H04W 48/16; H04W 4/06; H04W 72/042; H04W 72/121
USPC ........ 455/509, 452.1, 450, 440, 458, 101, 69, 455/561, 464, 455, 550, 451; 370/329, 254, 370/389, 312, 432, 310, 338, 229, 336, 437, 370/230; 709/205, 226
See application file for complete search history.

(56) References Cited

U.S. PATENT DOCUMENTS
8,045,495 B2 * 10/2011 Jung et al. ..................... 370/312
(Continued)

FOREIGN PATENT DOCUMENTS
CN     101553034     10/2009
(Continued)

OTHER PUBLICATIONS
Intel Corporation et al., "Text on the Unicast Control Information Elements for Group Resource Allocation (16.3.6)", IEEE 802.16 Broadband Wireless Access Working Group, IEEE C80216m-09/3043, Dec. 2009.
(Continued)

*Primary Examiner* — Tan Trinh
(74) *Attorney, Agent, or Firm* — Lee, Hong, Degerman, Kang & Waimey

(57) ABSTRACT

Provided is a group resource allocation method, including: receiving, from a base station, a group configuration message containing multi-input multi-output (MIMO) mode set information for indicating an MIMO mode set, corresponding to a group containing at least one terminal; receiving, from the base station, a control message which contains resource offset information for indicating the location in the group at which resource allocation begins, control information which commands the stream index allocated to each scheduled terminal in the group, and resource allocation bitmap information for indicating the size of allocated resource for each scheduled terminal in the group; and determining the resource domain allocated by the base station, based on at least one information among the resource offset information, the control information and the resource allocation bitmap information.

13 Claims, 12 Drawing Sheets

(51) Int. Cl.
- H04B 7/04 (2006.01)
- H04L 5/00 (2006.01)
- H04W 4/06 (2009.01)
- H04W 48/16 (2009.01)

(52) U.S. Cl.
CPC ....... 48/16 (2013.01); *H04B 7/0413* (2013.01); *H04L 5/0091* (2013.01); *H04L 5/003* (2013.01); *H04L 5/0007* (2013.01)
USPC ........... 455/509; 455/450; 455/464; 455/451; 455/452.1; 370/329

(56) References Cited

U.S. PATENT DOCUMENTS

| | | | |
|---|---|---|---|
| 8,560,696 B2* | 10/2013 | Shrivastava et al. | 709/226 |
| 2008/0063278 A1 | 3/2008 | Vincent et al. | |
| 2008/0095071 A1* | 4/2008 | Lu et al. | 370/254 |
| 2008/0101269 A1* | 5/2008 | Jung et al. | 370/312 |
| 2008/0228878 A1* | 9/2008 | Wu et al. | 709/205 |
| 2009/0075667 A1* | 3/2009 | Bourlas | 455/452.1 |
| 2009/0154418 A1* | 6/2009 | Kang et al. | 370/329 |
| 2009/0181689 A1* | 7/2009 | Lee et al. | 455/450 |
| 2012/0093116 A1* | 4/2012 | Kim et al. | 370/329 |
| 2012/0320837 A1* | 12/2012 | Kim et al. | 370/329 |

FOREIGN PATENT DOCUMENTS

| | | |
|---|---|---|
| KR | 10-2009-0014792 | 2/2009 |
| KR | 10-2009-0064815 | 6/2009 |
| KR | 10-2010-0010498 | 2/2010 |

OTHER PUBLICATIONS

Korean Intellectual Property Office Application Serial No. 10-2011-0016076, Notice of Allowance dated Nov. 28, 2012, 5 pages.

Lim, et al., "Harmonized Awd Text on the Unicast Control Information Elements for Group Resource Allocation," IEEE 802.16 Broadband Wireless Access Working Group, IEEE C802.16m-09/0955r1, Apr. 2009, 8 pages.

The State Intellectual Property Office of the People's Republic of China Application Application No. 201180009536.4, Office Action dated Jul. 31, 2014, 7 pages.

* cited by examiner

US 8,903,441 B2

GROUP RESOURCE ALLOCATION METHOD AND DEVICE IN WIRELESS ACCESS SYSTEM

CROSS-REFERENCE TO RELATED APPLICATIONS

This application is the National Stage filing under 35 U.S.C. 371 of International Application No. PCT/KR2011/001265, filed on Feb. 23, 2011, which claims the benefit of earlier filing date and right of priority to Korean Application No. 10-2011-0016076, filed on Feb. 23, 2011, and also claims the benefit of U.S. Provisional Application Ser. No. 61/330,900, filed on May 4, 2010, U.S. Provisional Application Ser. No. 61/307,859, filed on Feb. 25, 2010, and U.S. Provisional Application Ser. No. 61/307,445, filed on Feb. 23, 2010, the contents of which are all incorporated by reference herein in their entirety.

TECHNICAL FIELD

The present disclosure relates to a resource allocation method, and more particularly, to a method and device for allocating resources to scheduled terminals in group resource allocation.

BACKGROUND ART

The present disclosure relates to a mobile communication system, and more specifically, to a group control in a mobile communication system.

In a mobile communication system, each base station transmits or receives data to or from a plurality of terminals through one cell/sector in a wireless channel environment. In a system operated using multiple carriers or the like, a base station receives packet traffic from a wired Internet network and transmits the received packet traffic to each terminal using a predetermined communication protocol.

In this case, downlink scheduling includes determination as to when the base station transmits data, to which terminal the data is transmitted, and which frequency region is used for data transmission. In addition, the base station receives and demodulates data from the terminal using a predetermined communication protocol and transmits packet traffic through a wired Internet network. On the other hand, uplink scheduling includes determination as to when uplink data is transmitted to the base station, which terminal transmits the uplink data, and which frequency band is used for uplink data transmission. In general, scheduling is performed such that a terminal with a good channel status transmits or receives data using more time and frequency resources.

FIG. 1 is a diagram illustrating time-frequency resource blocks.

A resource used for communication in a system operated using multiple carriers or the like may be divided into a time domain and a frequency domain. The resource may be defined by resource blocks (RBs) and each RB includes N subcarriers and M subframes or a predetermined time unit. Here, N and M may be 1.

One rectangle shown in FIG. 1 denotes one RB, and one RB includes at least one subcarrier located on one axis and a predetermined time unit located on the other axis. In downlink, the base station selects a terminal according to a predetermined scheduling rule, allocates one or more RBs to the selected terminal, and transmits data to the selected terminal using the allocated RBs.

In uplink, the base station selects a terminal and allocates one or more RBs to the selected user equipment according to predetermined scheduling rule. The terminal receives scheduling information indicating that the base station has allocated certain RBs to the terminal and transmits uplink data using the allocated RBs.

In the downlink scheduling scheme, the base station selects time-frequency RBs with a good channel status based on a downlink channel quality indicator (CQI) reported by the terminal and transmits data using the selected RBs. Since the time-frequency RBs with the good channel status are used, it is possible to transmit a larger amount of data while using restricted RBs. Thus, it is possible to increase overall data transfer capacity of the system. In the uplink scheduling scheme, a scheduler of the base station may measure the reception status of a pilot signal (or reference signal) transmitted from the terminal and select time-frequency RBs with a good uplink channel status. The scheduler of the base station may allocate the selected RBs to the user equipment, and the terminal may transmit uplink data using the allocated RBs.

The scheduling described above may be performed on a group basis.

Hereinafter, a group resource allocation method will be described in brief.

Group Resource Allocation (GRA)

Group resource allocation (GRA) method is a method for allocating resources to a plurality of users (i.e., terminals) belonging to one group in order to reduce overhead of control messages that a base station transmits to the terminals. Using the GRA method, it is possible to reduce signaling overhead in a network since the base station can compress and transmit control information, of which the base station informs terminals, on a group by group basis when individually allocating resources to the terminals.

The base station can use group control information for configuring and allocating resources to one or more terminals belonging to one group.

Here, the group control information may be referred to as an advanced MAP or "A-MAP. Multiple information elements are individually coded in the A-MAP associated with user specific control information of a single user or a user group. In the A-MAP, an ID of each terminal (for example, a station identifier (STID) of a specific terminal, a broadcast STID, and/or a multicast STID) is CRC-masked to be transmitted.

Since the A-MAP is individually encoded and masked with an STID, each terminal performs blind decoding of a region in which the A-MAP is transmitted in order to check whether or not an A-MAP destined for the terminal exists.

In this case, the terminal can detect the A-MAP using an STID, a broadcast STID, and/or a multicast STID (for example, a group ID, a persistent ID, a sleep/idle mode ID, or an MBS ID).

The terminal performs blind decoding based on a MAP size used in a corresponding system. In this case, the base station and/or the terminal may limit the size and type of the MAP to specific sizes and types so as to reduce the number of blind decodings.

For example, the base station and/or the terminal may limit the size of the A-MAP information element (IE) to three sizes such as 56 (or 64), 96, and 144 bits or to two sizes such as 56 (or 64) and 96.

It is assumed that one minimum A-MAP logical resource unit (MLRU) includes 48 data subcarriers, two MLRUs include 96 data subcarriers, and the size of the A-MAP IE is determined to be 56 or 96. In this case, the base station may transmit each A-MAP IE to the terminal by mapping a 56-bit A-MAP IE to 1 MLRU and mapping a 96-bit A-MAP IE to 2 MLRUs using an encoding method used for a downlink control channel (for example, using a tail-biting convolutional code (TBCC) or puncturing method).

In a case where the UL MIMO mode set is '0b10' in conventional group resource allocation, Mode 2 (i.e., CL SU-MIMO (SM)) is used. Here, Mt=1 (the number of streams that a terminal can have) and TNS (total number of streams)=2.

However, the TNS cannot be set to 2 in the CL SU-MIMO mode. This is because the TNS is the total number of streams used in uplink MU-MIMO (CSM).

DISCLOSURE OF THE INVENTION

Therefore, an object of the present disclosure is to provide a method of performing group resource allocation (GRA) by using Mode 3 (UL MU-MIMO mode) when the UL MIMO Mode set ID defined for UL GRA is '0b10' or '0b11.'

To achieve these and other advantages and in accordance with the purpose of the present disclosure, as embodied and broadly described herein, there is provided a group resource allocation (GRA) method, including: receiving, from a base station, a group configuration message containing multi-input multi-output (MIMO) mode set information for indicating an MIMO mode set, corresponding to a group containing at least one terminal; receiving, from the base station, a control message which contains resource offset information for indicating the location in the group at which resource allocation begins, control information which commands the stream index allocated to each scheduled terminal in the group, and resource allocation bitmap information for indicating the size of allocated resource for each scheduled terminal in the group; and determining the resource domain allocated by the base station, based on at least one information among the resource offset information, the control information and the resource allocation bitmap information.

The control message may be a GRA A-MAP information element (IE).

The control information may be an MIMO bitmap or a pilot stream index (PSI) bitmap.

The MIMO mode set information may indicate an open-loop multi-user (OL MU)-MIMO mode in which the total number of streams is two, and the number of streams possessed by a terminal is one.

The stream index may be 0 or 1.

The resource allocation of terminals having the same stream index in the group may be performed on adjacent resources as the order of indices of the terminals increases, starting from a resource offset for the group.

The resource allocation of a terminal having a first stream index for each stream index in the group may be started from the resource offset for the group.

The resource size may represent the number of logical resource units (LRUs).

When the stream indices allocated to the scheduled terminals are different, the resources allocated from the base station may be shared between the scheduled terminals in the group.

The control message may further contain user bitmap information that indicates the scheduled terminals in the group.

The size of the control information may be identical to the number of terminals scheduled in the user bitmap.

The method may further include transmitting/receiving data bursts to/from the base station through the determined resource domain.

To achieve these and other advantages and in accordance with the purpose of the present disclosure, as embodied and broadly described herein, there is provided a terminal for receiving a resource allocated through GRA, including: a radio frequency (RF) unit configured to transmit/receive a radio signal to/from an outside thereof; and a control unit configured to control the RF unit to receive, from a base station, a group configuration message containing multi-input multi-output (MIMO) mode set information for indicating an MIMO mode set, corresponding to a group containing at least one terminal, control the RF unit to receive, from the base station, a control message which contains resource offset information for indicating the location in the group at which resource allocation begins, control information which commands the stream index allocated to each scheduled terminal in the group, and resource allocation bitmap information for indicating the size of allocated resource for each scheduled terminal in the group, and control the terminal to determine the resource domain allocated by the base station, based on at least one information among the resource offset information, the control information and the resource allocation bitmap information.

The control unit may control the terminal so that the resource allocation of terminals having the same stream index in the group is performed on adjacent resources as the order of indices of the terminals increases, starting from a resource offset for the group.

The control unit may control the terminal so that the resource allocation of a terminal having a first stream index for each stream index in the group is started from the resource offset for the group.

The control unit may control the terminal to share resources with terminals having different stream indices.

As described above, according to the present disclosure, OL MU-MIMO Mode is used as an uplink MIMO mode in GRA, so that resources are shared by allocating different stream indices to scheduled terminals in a corresponding group, thereby efficiently using limited resources.

MODES FOR CARRYING OUT THE PREFERRED EMBODIMENTS

Figure 1:
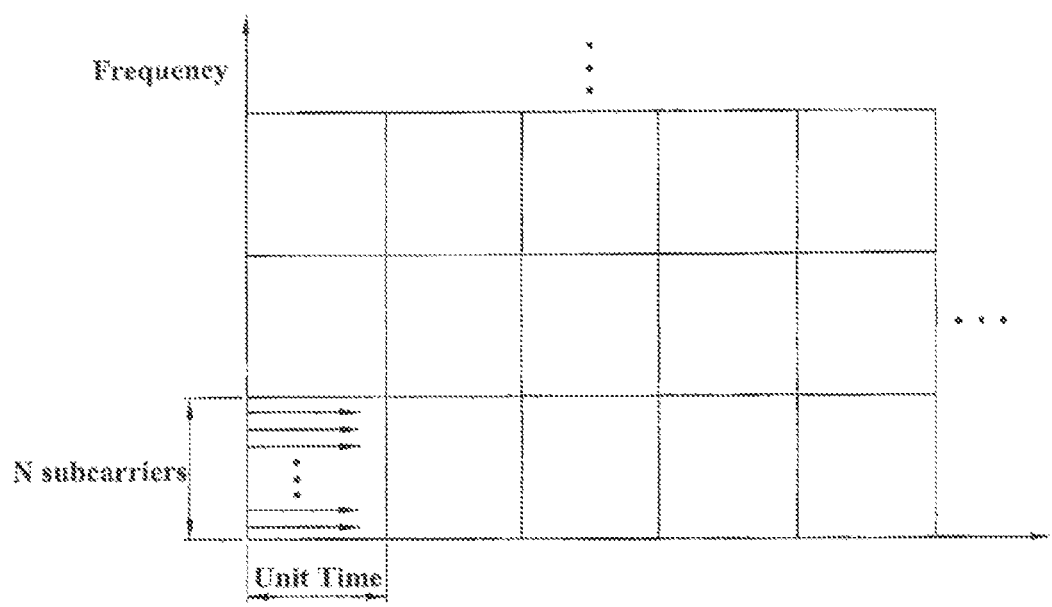
FIG. 1 is a diagram illustrating time-frequency resource blocks.

Hereinafter, exemplary embodiments of the present disclosure will be described in detail with reference to the accompanying drawings. In the following description, only parts needed to understand operation according to the present disclosure will be described and other details are omitted so as not to obscure the subject matter of the present disclosure.

In exemplary embodiments described below, components and features of the present disclosure are combined with each other in a predetermined pattern. Each component or feature may be considered to be optional unless stated otherwise. Each component or feature may not be combined with other components or features. Further, some components and/or features are combined with each other to configure the exemplary embodiments of the present disclosure. The order of operations described in the exemplary embodiments of the present disclosure may be modified. Some components or features of any exemplary embodiment may be included in other exemplary embodiments or substituted with corresponding components or features of other exemplary embodiments.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with a Relay Node (RN) or a Relay Station (RS). The term "terminal" may also be replaced with a User Equipment (UE), a Mobile Station (MS), a Mobile Subscriber Station (MSS), an Advanced MS (AMS) or a Subscriber Station (SS) as necessary.

The embodiments of the present disclosure may be implemented through various means. For example, the embodiments of the present disclosure may be implemented by hardware, firmware, software, or combination thereof.

According to the implementation using the hardware, the method according to the embodiments of the present disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, etc.

According to the implementation using the firmware or software, the method according to the embodiments of the present disclosure may be implemented in the form of a module, procedure or function performing functions and operations described above. Software codes may be stored in a memory unit and executed by a processor. The memory unit may be located in the inside or outside of the processor, and communicate data with the processor using various means known in the art.

Specific terms used in the following description are provided for better understanding of the present disclosure and can be replaced with other terms without departing from the spirit of the present disclosure.

General Group Resource Allocation (GRA)

1. Grouping Mechanism

Grouping reference includes multi-input multi-output (MIMO) modes and hybrid automatic repeat request (HAQR) burst sizes. As a result, all groups can correspond to a given set of the MIMO modes and HAQR burst sizes.

The flow of a terminal can be allocated to DL and/or UL groups. Each DL or UL group can be identified by unique 12-bit group ID.

2. Group Configuration

Dynamic changes in a limited set of the MIMO modes and HARQ burst sizes can be possible in one group.

A base station can configure a group MIMO Mode set for each group between candidate sets previously defined for DL and UL.

The MIMO mode allocated to one flow in a group will be selected from the configured set.

3. Bitmap Information in GRA (1) User Bitmap

User bitmap refers to a bitmap using 1 bit for each terminal in a corresponding group so as to indicate whether or not a terminal has resource allocation in an AAI subframe.

The size of the user bitmap is determined by a base station, and may be 4, 8, 16 or 32 bits.

(2) MIMO Bitmap

MIMO bitmap indicates an MIMO mode for a corresponding scheduled terminal.

The MIMO bitmap is contained in a corresponding group only when a MIMO mode set in a corresponding group is set to '0b01.' When a user is added to the corresponding group, the MIMO mode set is indicated to the terminal through a group configuration MAC control message.

The size of the MIMO bitmap is identical to the number of flows of scheduled terminals in the corresponding group in a corresponding subframe. Corresponding bit values in the MIMO bitmap indicate (signal) an MIMO mode (mode 0 or mode 1) to each scheduled terminal.

(3) Resource Allocation Bitmap

Resource allocation bitmap refers to a bitmap that indicates an MCS/resource size for each scheduled user (AMS).

The resource allocation bitmap uses 5 bits for each terminal so as to indicate HARQ burst size and resource size for resource allocation of the terminal in a corresponding subframe.

First two bits indicate the HARQ burst size, and the next three bits indicate the resource size.

The 2-bit code for the burst size related to FID and the 3-bit resource size related to a corresponding group are based on information in the group configuration MAC control message.

When the long transmission time interval (TTI) indicator in the group configuration MAC control message for downlink allocation is set to '1,' downlink HARQ burst will not be allocated to a frame in which a super frame header (SFH) is transmitted.

Hereinafter, MIMO bitmap information supported in GRA will be described in brief.

First, DL MIMO Bitmap information and UL MIMO Bitmap information, supported in the GRA, are shown in the following Tables 1 and 2, respectively.

MIMO Bitmap Information for DL

TABLE 1

| MIMO Mode Set | Existence of MIMO Bitmap | Number of Bit Per Scheduled AMS | MIMO Mode Indication |
|---|---|---|---|
| 0b00 | No | N/A | OL SU-MIMO (SFBC with non-adaptive precoder) |
| 0b01 | Yes | 1 | 0b0: OL SU-MIMO (SFBC with non-adaptive precoder) 0b1: OL SU-MIMO (SFBC with non-adaptive precoder) with Mt = 2 |
| 0b10 | No | N/A | CL SU-MIMO with Mt = 1 |

MIMO Bitmap Information for UL

TABLE 2

| MIMO Mode Set | Existence of MIMO Bitmap | Number of Bit Per Scheduled AMS | MIMO Mode Indication |
|---|---|---|---|
| 0b00 | No | N/A | OL SU-MIMO (SFBC with non-adaptive precoder) |
| 0b01 | Yes | 1 | 0b0: OL SU-MIMO (SFBC with non-adaptive precoder) with Mt = 2 0b1: OL SU-MIMO (SFBC with non-adaptive precoder) with Mt = 2 |
| 0b10 | No | N/A | CL SU-MIMO with Mt = 1, TNS = 2 |

As shown in Tables 1 and 2, when one or more terminals are added to a corresponding group, which MIMO mode set is used among DL/UL MIMO modes in the corresponding group is transmitted to the terminal through an MIMO mode set field of the group configuration MAC (AAI_GRP-CFG) message.

The following Tables 3 and 4 show additional information on Tables 1 and 2.

That is, Tables 3 and 4 show which MIMO mode set each MIMO mode set ID uses and how SM restriction is.

DL MIMO Mode Set Candidates

TABLE 3

| MIMO Mode Set ID | DL Group MIMO Mode Set | SM Restriction |
|---|---|---|
| 0b00 | Mode 0 | N/A |
| 0b01 | Mode 0, Mode 1 | Mt = 2 |
| 0b10 | Mode 2 | Mt = 1 |
| 0b11 | Reserved | N/A |

UL MIMO Mode Set Candidates

TABLE 4

| MIMO Mode Set ID | UL Group MIMO Mode Set | SM Restriction |
|---|---|---|
| 0b00 | Mode 0 | N/A |
| 0b01 | Mode 0, Mode 1 | Mt = 2 |
| 0b10 | Mode 2 | Mt = 1 |
| 0b11 | Reserved | N/A |

Referring to Tables 3 and 4, in a case where the MIMO mode set ID is '0b01,' both Mode 0 and Mode 1 are supported in a corresponding group. When resources are actually allocated, which one of both the Mode 0 and Mode 1 each terminal uses is indicated to the terminal through the MIMO bitmap of the GRA A-MAP IE.

Figure 2:
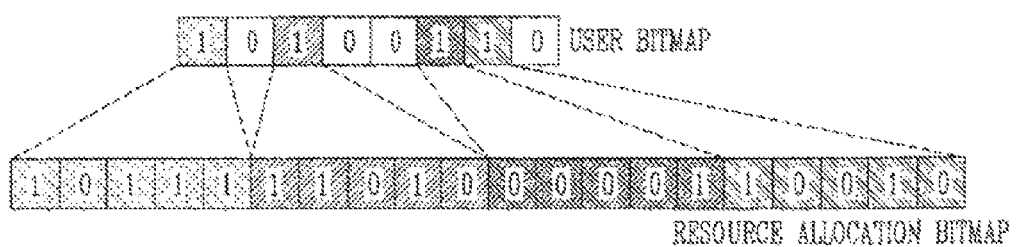
FIG. 2 illustrates an example of a group resource allocation (GRA) method using a bitmap.

FIG. 2 illustrates an example of a GRA method using bitmaps.

Particularly, FIG. 2 illustrates a GRA method using a user bitmap and a resource allocation bitmap (RAB), when the DL/UL MIMO Mode set is '0b00' or '0b10.'

Bitmaps may be used to provide resource allocation information with terminals contained in a predetermined group in the GRA.

Referring to FIG. 2, the user bitmap that is a first bitmap indicates which terminal is scheduled at a corresponding time in a corresponding group.

Bits of the user bitmap correspond to the terminals contained in the group, respectively. As shown in FIG. 2, it can be seen that eight users are contained in one group. If each bit of the user bitmap is set to '1,' this indicates that a corresponding terminal is a user scheduled in the current frame (i.e., a user to which a resource is allocated).

In the user bitmap of FIG. 2, it can be seen that first, third, sixth and seventh users are scheduled in the corresponding group. In this case, each terminal can acquire, from the base station, location information that indicates its own location in the user bitmap when the terminal is added to the group.

The resource allocation bitmap represents resource allocation information of the scheduled users. Information on HARQ burst sizes, sizes of allocated resources, etc. may be contained in the resource allocation information.

In FIG. 2, information on one terminal may be expressed as 5 bits. Since a total of four terminals are scheduled in the user bitmap, the size of the resource allocation bitmap becomes 20 bits (5×4).

In this case, the resource allocation bitmap contains HARQ burst information of the scheduled terminals and allocated resource allocation size information (e.g., the number of logical resource units (LRUs)).

When a terminal is added to a group, the base station allocates, to the terminal, a user bitmap index used in the user bitmap of the group. In this case, the size of the user bitmap may be fixed or variable in the corresponding group.

Figure 3:
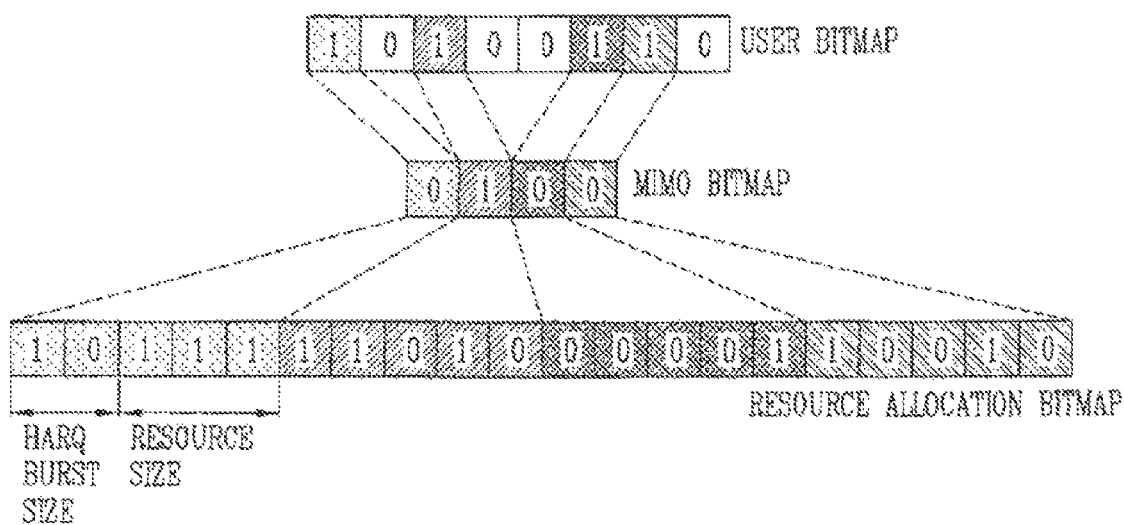
FIG. 3 illustrates an example of a GRA method using a multi-input multi-output (MIMO) bitmap.

FIG. 3 illustrates an example of a GRA method using an MIMO bitmap.

Particularly, FIG. 3 illustrates a GRA method using a user bitmap, an MIMO bitmap and a resource allocation bitmap (RAB), when the DL/UL MIMO Mode set is '0b01.'

The MIMO bitmap contains in the GRA A-MAP IE only when the DL/UL MIMO Mode set is '0b01.'

Referring to FIG. 3, it can be seen that the number of scheduled terminals is identical to the size of the MIMO bitmap in the user bitmap.

In the user bitmap of FIG. 3, it can be seen that first, third, sixth and seventh users are scheduled in a corresponding group. Bits of the MIMO bitmap respectively correspond to the scheduled terminals in the scheduled order of the terminals.

Here, each bit of the MIMO bitmap indicates the MIMO mode of each terminal scheduled in the corresponding group.

For example, if each bit of the MIMO bitmap is set to '0,' Mode 0 is used. If each bit of the MIMO bitmap is set to '1,' Mode 1 is used.

As shown in FIG. 3, in a case where the MIMO bitmap is '0100'; the first, sixth and seventh terminals use Mode 0, and the third terminal uses Mode 1.

Group Resource Allocation A-MAP IE (GRA A-MAP IE)

Group control information is information used to configure and allocate resources to one or more users (terminals) in one user group. The group scheduling requires two operations.

First, a base station may perform an operation of allocating one user in one group.

The base station transmits, to terminals, a group configuration MAC management message, group configuration A-MAP IE or group configuration MAC control message so as to add one user to one group in downlink or uplink.

Next, the base station may allocate resources to users in the one group. The base station transmits DL/UL GRA A-MAP IE to the terminals so as to allocate resources to one or more users in the one group.

The DL/UL GRA A-MAP IE is contained user-specific resource allocation information in an A-MAP region. The GRA A-MAP IE contains a bitmap for representing scheduled users or signaling MIMO mode HARQ burst sizes and resource sizes.

Hereinafter, parameters contained in the GRA A-MAP IE will be described in brief.

(1) Resource Offset

: Resource offset indicates an offset of LRU in which resource allocation for a corresponding group is started.

(2) HFA Offset

: HFA offset indicates the start of HARQ feedback channel indices for scheduled terminal in the corresponding group.

(3) User Bitmap

: User bitmap refers to a bitmap that uses 1 bit for each terminal in the corresponding group so as to indicate whether or not the terminal has resource allocation in an AAI subframe.

(4) MIMO Bitmap

: MIMO bitmap indicates an MIMO mode to a corresponding scheduled terminal. The MIMO bitmap is contained in the corresponding group only when the MIMO mode set in the corresponding group is set to '0b01.' When a user is added to the corresponding group, the MIMO mode set is indicated to the terminal through a group configuration MAC control message.

(5) Resource Allocation Bitmap

: Resource allocation bitmap refers to a bitmap that indicates an MCS/resource size for each scheduled user (AMS).

Hereinafter, a method of using Mode 3 (open-loop multi-user (OL MU)-MIMO with Mt=1 and TNS=2) other than existing Mode 2 when the UL MIMO Mode set ID defined for GRA is '0b10' (or '0b11') will be described in detail.

When UL MIMO Mode Set is '0b10' (or '0b11'), Use of Mode 3 (OL MU-MIMO with Mt=1, TNS=2)

First, the following Tables 5 and 6 show UL MIMO mode set candidates and MIMO Mode bitmap information for UL, proposed in the present disclosure, when the UL MIMO Mode set ID is '0b10.'

UL MIMO Mode Set Candidates

TABLE 5

| MIMO Mode Set ID | UL Group MIMO Mode Set | SM Restriction |
|---|---|---|
| 0b00 | Mode 0 | N/A |
| 0b01 | Mode 0, Mode 1 | Mt = 2 |

TABLE 5-continued

| MIMO Mode Set ID | UL Group MIMO Mode Set | SM Restriction |
|---|---|---|
| 0b10 | Mode 3 | Mt = 1 |
| 0b11 | Reserved | — |

MIMO Bitmap Information for UL

TABLE 6

| MIMO Mode Set | Existence of Second Bitmap | Length of Bit per Scheduled AMS | MIMO Mode Indication |
|---|---|---|---|
| 0b00 | No | — | OL SU-MIMO (SFBC with non-adaptive precoder) |
| 0b01 | Yes | 1 | 0b0: OL SU-MIMO (SFBC with non-adaptive precoder) with Mt = 2<br>0b1: OL SU-MIMO (SFBC with non-adaptive precoder) with Mt = 2 |
| 0b10 | No | — | OL SU-MIMO with Mt = 1, TNS = 2 |

The following Tables 7 and 8 show UL MIMO mode set candidates and MIMO Mode bitmap information for UL, proposed in the present disclosure, when the UL MIMO Mode set ID is '0b11.'

UL MIMO Mode Set Candidates

TABLE 7

| MIMO Mode Set ID | UL Group MIMO Mode Set | SM Restriction |
|---|---|---|
| 0b00 | Mode 0 | N/A |
| 0b01 | Mode 0, Mode 1 | Mt = 2 |
| 0b10 | Mode 2 | Mt = 1 |
| 0b11 | Mode 0, Mode 3 | Mt = 1 |

MIMO Bitmap Information for UL

TABLE 8

| MIMO Mode Set | Existence of Second Bitmap | Length of Bit per Scheduled AMS | MIMO Mode Indication |
|---|---|---|---|
| 0b00 | No | — | OL SU-MIMO (SFBC with non-adaptive precoder) |
| 0b01 | Yes | 1 | 0b0: OL SU-MIMO (SFBC with non-adaptive precoder) with Mt = 2<br>0b1: OL SU-MIMO (SFBC with non-adaptive precoder) with Mt = 2 |
| 0b10 | No | — | CL SU-MIMO with Mt = 1, TNS = 2 |
| 0b11 | Yes | | MIMO mode for this group<br>0b0: OL SU-MIMO (SFBC with non-adaptive precoder) with Mt = 2<br>0b1: OL SU-MIMO with Mt = 1, TNS = 2 |

In a case where the MIMO Mode set ID is '0b11,' an indicator indicating which one of both Mode 0 and Mode 3 is to be used may be contained in GRA A-MAP IE, and the GRA A-MAP IE may be transmitted to a terminal.

The following Table 9 shows an example of a GRA A-MAP IE format that contains an indicator indicating UL MIMO Mode (any one of Mode 0 and Mode 3) when the MIMO Mode set ID is '0b11.'

TABLE 9

| Syntax | Size in bits | Description/Notes |
|---|---|---|
| Group Resource Allocation A-MAP IE( ) { | — | — |
| A-MAP IE Type | 4 | Group Resource Allocation A-MAP IE |
| If (UL Allocation && D <U){ | | If group corresponds to UL allocations and the number of DL AAI subframes (D) is less than the number of UL AAI subframes (U) |
| Allocation Relevance | 1 | 0b0: Allocation in the first UL subframe relevant to an A-MAP region<br>0b1: Allocation in the second UL subframe relevant to an A-MAP region |
| } | | |
| User Bitmap | Variable | Bitmap to indicate scheduled AMSs in a group.<br>The size of the bitmap is equal to the User Bitmap Size signaled to each AMS in the Group configuration MAC Control message.<br>0: AMS not allocated in this AAI subframe<br>1: AMS allocated in this AAI subframe |
| Resource Offset | 7 | Indicates starting LRU for resource allocation to this group |
| HFA Offset | 6 | Indicates the start of HARQ Feedback index used for scheduled allocations |
| If(Group MIMO mode set ==0b01){ | | |
| MIMO Bitmap | Variable | Bitmap to indicate MIMO mode for the scheduled AMSs<br>0: Mode 0<br>1: Mode 1 |
| } else if(UL Group MIMO mode set ==0b11){ | | |
| MIMO Mode Indicator | 1 | Indicates the MIMO mode for the group<br>0: Mode 0<br>1: Mode 3 |
| } | | |
| Resource Allocation Bitmap | Variable | Bitmap to indicate burst size/resource size for each scheduled AMS |

If the base station sets UL GRA MIMO mode for a specific group to a fourth mode (e.g., '0b11'), the base station may use OL MU-MIMO as a basic MIMO mode (Mode 3) for the group. The base station may set the OL MU-MIMO as OL SU-MIMO (Mode 0), based on the resource use efficiency.

As another method, there is proposed a method of implicitly pairing terminals using MU-MIMO for each terminal with respect to scheduled terminals in a corresponding group, using an MIMO bitmap.

Figure 4:
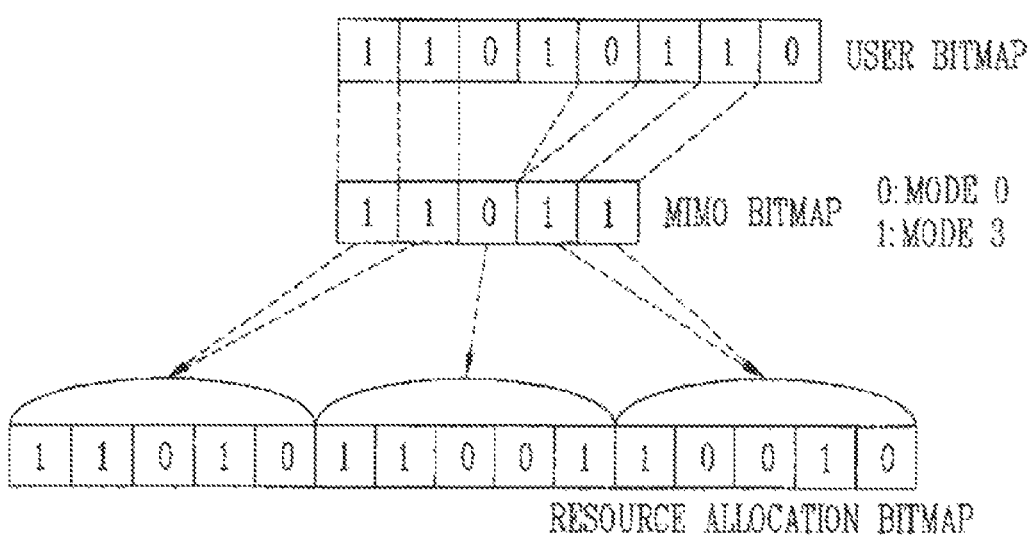
FIG. 4 is a diagram illustrating a method of indicating an MIMO mode to a corresponding group and pairing terminals, using an MIMO bitmap according to an embodiment of the present disclosure.

FIG. 4 is a diagram illustrating a method of indicating an MIMO mode to a corresponding group and pairing terminals, using an MIMO bitmap according to an embodiment of the present disclosure.

As shown in FIG. 4, in a case where the UL group MIMO mode set is '0b11,' both Mode 0 and Mode 3 can be used. A corresponding bit in the MIMO bitmap is set to '0' in Mode 0, and a corresponding bit in the MIMO bitmap is set to '1' in Mode 3.

In the case of Mode 3 (in a case where the corresponding bit in the MIMO bitmap is set to '1'), corresponding terminals are sequentially paired.

Referring to FIG. 4, it can be seen that first and second terminals are paired and fourth and fifth terminals are paired. HARQ burst size and resource size information for each scheduled terminal is expressed in an RAB.

As shown in FIG. 4, the paired terminals use the same resource information (the same HARQ burst size and resource size).

That is, the first and second terminals use an RAB of '11010' together, and the third terminal uses an RAB of '11001.' The fourth and fifth terminals use an RAB of '10010' together.

Hereinafter, methods in which resources are allocated to scheduled terminals through GRA when the MIMO Mode set proposed in the present disclosure is set to '0b10' (or '0b11'), i.e., when it is indicated to use Mode 3 (OL MU-MIMO mode with Mt=1 and TNS=2), will be described in detail.

<Method 1>

A terminal can identify how many resources are allocated to terminals included in a group through each RAB.

A first terminal among terminals scheduled through a user bitmap receives a resource allocated by a resource size of the RAB from a resource offset point.

Here, the resource size allocated to the terminal refers to the number of logical resource units (LRUs).

Resource allocation rules of an N-th terminal according to Method 1.

1. If the size (RAB) of a resource allocated to the N-th terminal is different from that of a resource allocated to an (N−1)-th terminal, the N-th terminal consecutively receive the resource immediately after the (N−1)-th terminal receives the resource.

2. If the size (RAB) of the resource allocated to the N-th terminal (AMS) is identical to that of the resource allocated to the (N−1)-th terminal, and the size of the resource allocated to the (N−1)-th terminal is identical to that of a resource allocated to an (N−2)-th terminal, the N-th terminal consecutively receive the resource immediately after the (N−1)-th terminal receives the resource.

3. If the size (RAB) of the resource allocated to the N-th terminal (AMS) is identical to that of the resource allocated to the (N−1)-th terminal, and the size of the resource allocated to the (N−1)-th terminal is different from that of the resource allocated to the (N−2)-th terminal, the N-th terminal receives the same resource as the (N−1)-th terminal.

Figure 5:
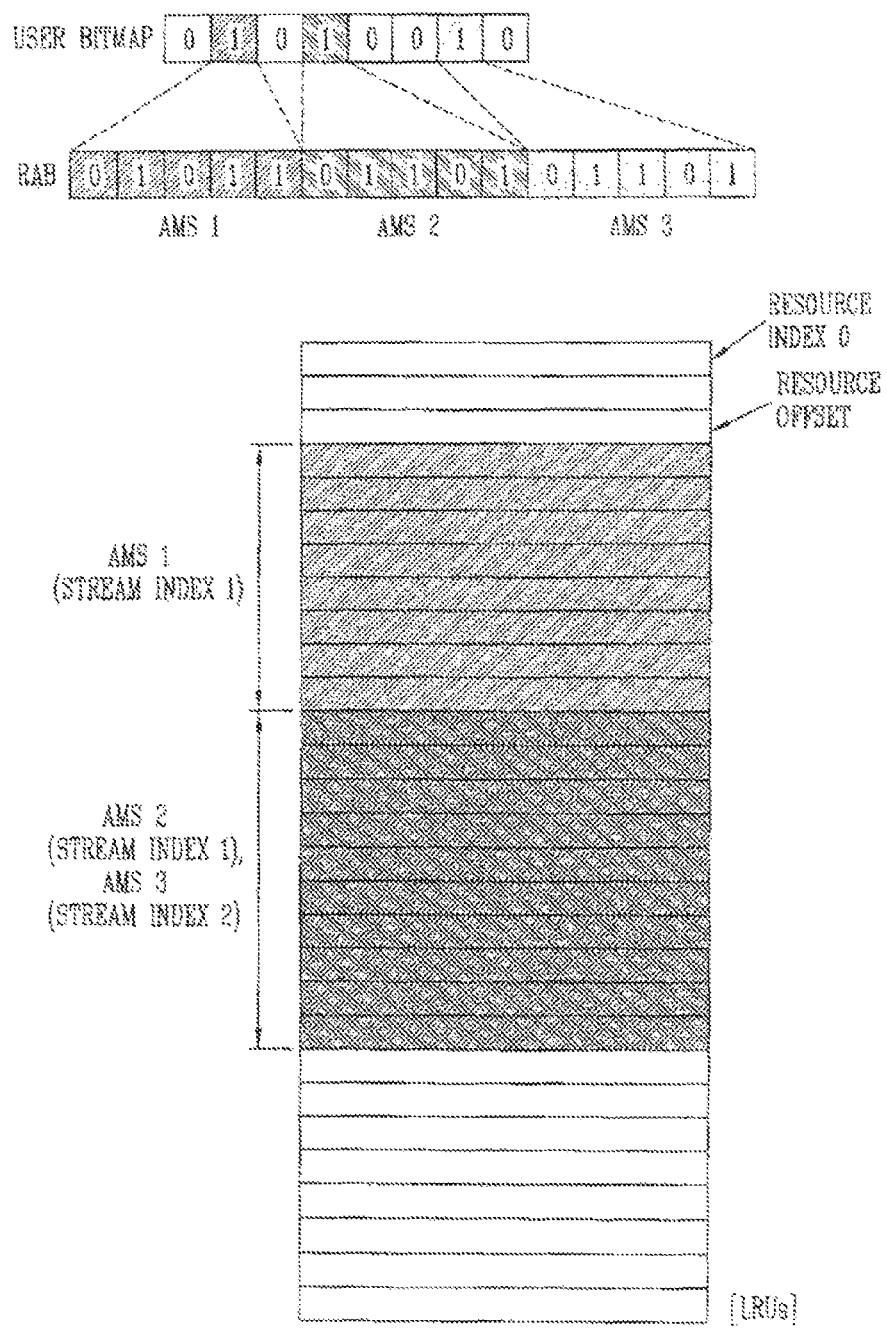
FIG. 5 illustrates a method of allocating a resource to each scheduled terminal in a corresponding group in a GRA method according to Method 1.

FIG. 5 illustrates a method of allocating a resource to each scheduled terminal in a corresponding group in a GRA method according to Method 1.

Referring to FIG. 5, it can be seen that the resource allocation sizes of scheduled terminals (Terminals 1 to 3) in a user bitmap are 8, 10 and 10, respectively. Here, the resource allocation size refers to the number of LRUs.

That is, Terminal 1 receives a resource size of 8 LRUs, and each of Terminals 2 and 3 receives a resource size of 10 LRUs.

As shown in FIG. 5, since the resource size of the scheduled Terminal 1 is 8, Terminal 1 receives 8 LRUs respectively corresponding to resource indices 3 to 10, starting from resource offset (3).

Terminal 2 has a resource size of 10 LRUs, and the resource size of the terminal 2 is different from that (8 LRUs) of Terminal 1. Hence, Terminal 2 receives a new resource immediately after Terminal 1 receives the resource. That is, Terminal 2 receives 10 LRUs respectively corresponding to resource indices 11 to 20.

Since Terminal 3 has a resource size of 10 LRUs identical to that (10 LRUs) of Terminal 2, Terminal 3 uses the same resource as Terminal 2. Terminal 2 uses a stream index of 1, and Terminal 3 uses a stream index of 2. Here, the stream index of Terminal 2 may be 0, and the stream index of Terminal 3 may be 1.

The resources allocated to the scheduled terminal (Terminals 1 to 3) according to Method 1 may be rearranged as shown in the following Table 10.

TABLE 10

|  | Resource allocation size | Resource index to be used | Stream index |
|---|---|---|---|
| Terminal 1 | 8 | 3-10 | 1 |
| Terminal 2 | 10 | 11-20 | 1 |
| Terminal 3 | 10 | 11-20 | 2 |

<Method 2>: Implicit Method 1

Each terminal has an RAB, and the terminal can identify resource sizes allocated to all terminals included in a group. It can be implicitly calculated which terminals use the same resource based on the resource size of each terminal.

Detailed calculation rules according to Method 2 are as follows.

1. If (N+1)-th to (N+M)-th terminals can share the same resource with the N-th terminal, the N-th terminal has a stream index of 1, and the (N+1)-th to (N+M)-th terminals use a stream index of 2. The stream index is an example, and may have another value 2. If the resource size of a terminal having a stream index of 1 is greater than that of consecutive some terminals, and the resource size of subsequent terminals can be included a resource of the terminal having the stream index of 1, the subsequent terminals use the same resource as the terminal having the stream index 1, and have a stream index of 2.

3. If the resource size of the (N+1)-th terminal is grater than that of the N-th terminal when the N-th terminal uses the stream index of 1 (e.g., N is 5 LRUs and N+1 is 6 LRUs), the (N+1)-th terminal does not share the resource with the N-th terminal, and receives a new resource after the N-th terminal receives the resource. The stream index of the (N+1)-th terminal becomes 1.

4. The resource allocation for the stream indices of 1 and 2 is started from a resource offset.

For example, it is assumed that the resource sizes of scheduled terminals (Terminal 1 to 6) included in a specific group are 8, 4, 2, 1, 4 and 5, respectively, and the resource offset is 0.

According to the Method 2, scheduled Terminal 1 receives a resource of 8 LRUs respectively corresponding to resource indices of 0 to 7, and has a stream index of 1.

Since the resource size of Terminal 2 is smaller than that of Terminal 1, Terminal 2 shares the resource with Terminal 1. That is, Terminal 2 receives a resource of 4 LRUs respectively corresponding to resource indices of 0 to 3, and has a stream index of 2.

Since Terminal 3 can share a resource having a resource size of 2 LRUs with Terminal 1, Terminal 3 receives a resource of 2 LRUs respectively corresponding to resource indices of 4 and 5, and has a stream index of 2.

Since Terminal 4 can share a resource having a resource size of 1 LRU with Terminal 1, Terminal 4 receives of resource of 1 LRU corresponding to a resource index of 6, and has a stream index of 2.

Since Terminal 5 cannot share the resource with Terminal 1, Terminal 5 receives a new resource immediately after Terminal 1 receives the resource. That is, Terminal 5 receives a resource of 4 LRUs of resource indices of 8 to 11, and has a stream index of 1.

Since the resource size of Terminal 6 is greater than that of Terminal 5, Terminal 6 receives a new resource immediately after Terminal 5 receives the resource, and has a stream index of 1.

The resources allocated to the scheduled terminals (Terminals 1 to 6) according to Method 2 may be rearranged as shown in the following Table 11.

TABLE 11

|  | Resource allocation size | Resource index to be used | Stream index |
|---|---|---|---|
| Terminal 1 | 8 | 0-7 | 1 |
| Terminal 2 | 4 | 0-3 | 2 |
| Terminal 3 | 2 | 4-5 | 2 |
| Terminal 4 | 1 | 6 | 2 |
| Terminal 5 | 4 | 8-11 | 1 |
| Terminal 6 | 5 | 12-16 | 1 |
| ... | ... | ... | ... |

<Method 3>: Implicit Method 2

Resource allocation rules according to Method 3 are as follows.

A terminal having a stream index of 1 always receives a new resource.

If it is decided that terminals MS2 and MS3 followed after the terminal having the stream index of 1 can share the resource with the terminal having the stream index of 1, the terminals MS2 and MS3 use the resource of the terminal having the stream index of 1, and have a stream index of 2.

If a terminal cannot share the resource of the terminal having the stream index of 1 because of their resource sizes, the corresponding terminal receives a new resource immediately after the terminal having the stream index of 1 receives the resource, and has a stream index of 2.

The resource allocation for stream indices of 1 and 2 is started from a resource offset.

Figure 6:
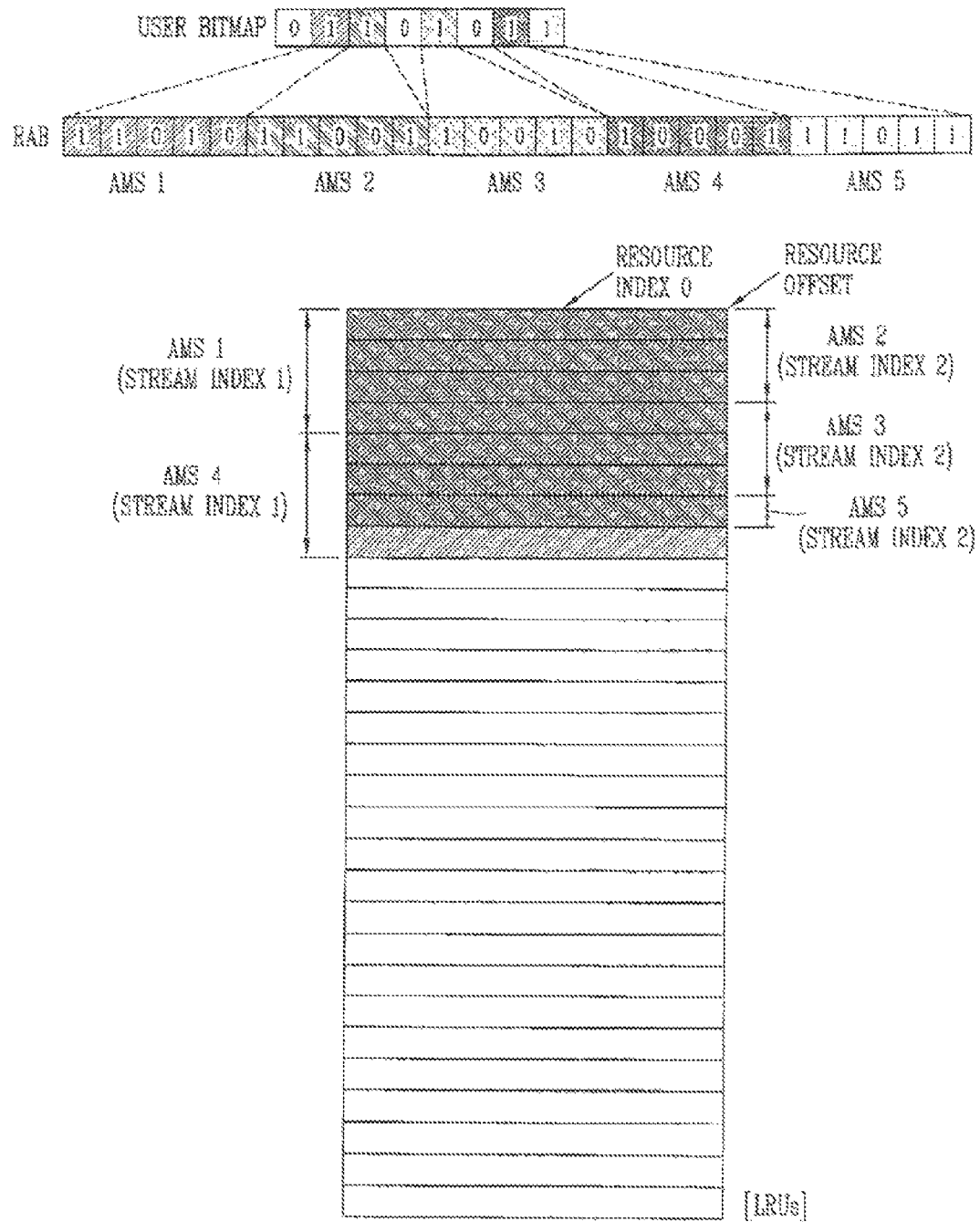
FIG. 6 illustrates a method of allocating a resource to each scheduled terminal in a corresponding group in a GRA method according to Method 3.

FIG. 6 illustrates a method of allocating a resource to each scheduled terminal in a corresponding group in a GRA method according to Method 3.

As shown in FIG. 6, the resource sizes of scheduled terminals (Terminals 1 to 5) included in a corresponding group are 4, 3, 3, 4 and 1 LRUs, respectively. Terminal 1 has a stream index of 1, and the resource offset of Terminal 1 is an index of '0.'

The resource allocation of scheduled terminals included in a specific group according to Method 3 will be described. Terminal 1 receives a resource of 0 to 3 LRUs, starting from the resource offset.

Since Terminal 2 can share a resource having a resource size of 3 LRUs with Terminal 1, Terminal 2 has a stream index of 2. Terminal 2 receives a resource having resource indices of 0 to 2 LRUs, and shares the resource with Terminal 1.

Since Terminal 3 can share a resource having a resource size of 3 LRUs with Terminal 1, Terminal 3 has a stream index of 2. Terminal 3 receives a resource having resource indices of 3 to 5 LRUs, and partially shares the resource with Terminal 1.

Since Terminal 4 can share a resource having a resource size of 4 LRUs with Terminal 3, Terminal 4 has a stream index of 1. Terminal 4 receives a resource having resource indices of 4 to 7 LRUs, and partially shares the resource with Terminal 3.

Since Terminal 5 can share a resource having a resource size of 1 LRU with Terminal 3, Terminal 5 has a stream index of 2. Terminal 5 receives a resource having a resource index of 6 LRU, and partially shares the resource with Terminal 3.

The resources allocated to the scheduled terminals (Terminals 1 to 5) according to Method 3 may be rearranged as shown in the following Table 12.

TABLE 12

|  | Resource allocation size | Resource index to be used | Stream index |
|---|---|---|---|
| Terminal 1 | 4 | 0-3 | 1 |
| Terminal 2 | 3 | 0-2 | 2 |
| Terminal 3 | 3 | 3-5 | 2 |
| Terminal 4 | 4 | 4-7 | 1 |
| Terminal 5 | 1 | 6 | 2 |
| ... | ... | ... | ... |

<Method 4>: Implicit Method 3

Resource allocation rules according to Method 4 are as follows.

Scheduled terminals alternately use stream indices of 1 and 2 and receive resources.

If a resource having stream indices of 1 and 2 are allocated, the terminals share the resource. If a resource having a stream index of 1 is allocated, a resource is allocated after the resource having the stream index of 1 is finally allocated. If a resource having a stream index of 2 is allocated, a resource is allocated after the resource having the stream index of 2 is finally allocated. The resource allocation for the first stream indices of 1 and 2 is started from a resource offset.

Figure 7:
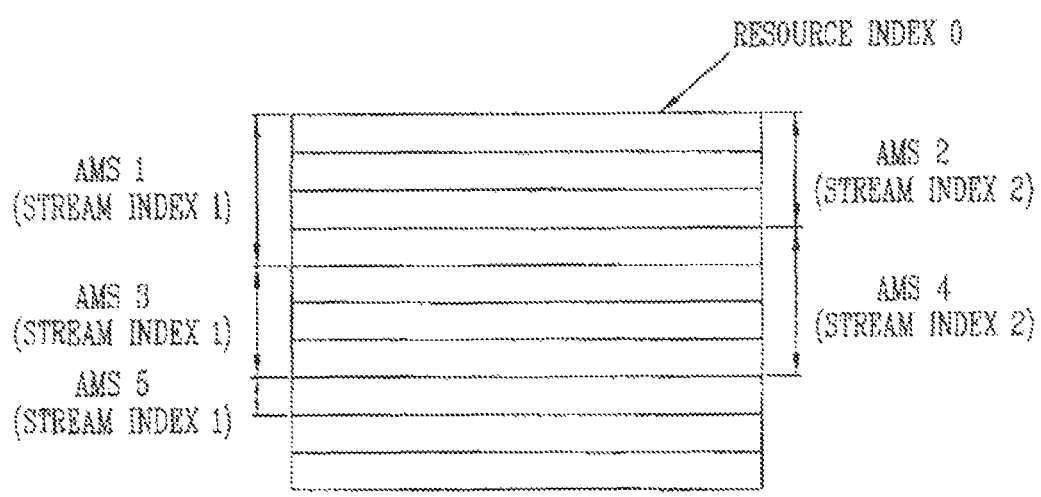
FIG. 7 illustrates a method of allocating a resource to each scheduled terminal in a corresponding group in a GRA method according to Method 4.

FIG. 7 illustrates a method of allocating a resource to each scheduled terminal in a corresponding group in a GRA method according to Method 4.

As shown in FIG. 7, the resource sizes of scheduled terminals (Terminals 1 to 5) are 4, 3, 3, 4 and 1 LRUs, respectively, and the resource offset index in a group corresponds to 0.

Referring to FIG. 7, Terminal 1 receives a resource having resource indices 0 to 3 LRUs, starting from the resource offset, and has a stream index of 1.

Terminal 2 has a stream index of 2, and shares the resource with Terminal 1. That is, Terminal 2 receives a resource having resource indices of 0 to 2 LRUs.

Terminal 3 has a stream index of 1, and receives a resource having resource indices of 4 to 6 LRUs next to the resource indices of the resource allocated to Terminal Terminal 4 has a stream index of 2, and partially shares the resource with Terminals 1 and 3. Thus, Terminal 4 receives a resource having resource indices of 3 to 6 LRUs.

Terminal 5 has a stream index of 1, and receives a resource having a resource index of 7 LRU next to the resource indices of the resource allocated to Terminal 3.

The resources allocated to the scheduled terminals (Terminals 1 to 5) in the specific group according to Method 4 may be rearranged as shown in the following Table 13.

TABLE 13

|  | Resource allocation size | Resource index to be used | Stream index |
|---|---|---|---|
| Terminal 1 | 4 | 0-3 | 1 |
| Terminal 2 | 3 | 0-2 | 2 |
| Terminal 3 | 3 | 4-6 | 1 |
| Terminal 4 | 4 | 3-6 | 2 |
| Terminal 5 | 1 | 7 | 1 |
| ... | ... | ... | ... |

<Method 5>: Implicit Method 4

Resource allocation rules according to Method 5 are as follows.

It is assumed that a resource is allocated after a resource is allocated to a terminal having a stream index of 1. In a case where a terminal receives a resource having a resource size greater than the sum of resource sizes of subsequent terminals having the stream index of 1, the corresponding terminal having a stream index of 2 shares the resource with the terminals having the stream index of 1. In a case where a terminal receives a resource having a resource size smaller than the sum of resource sizes of subsequent terminals having the stream index of 1, the corresponding terminal has a stream index of 1 and uses a new resource.

It is assumed that a resource is allocated after a resource is allocated to a terminal having a stream index of 2. In a case where the resource size of a resource that a terminal having a stream index of 2 does not share with a terminal having a stream index of 1 is smaller than that of a resource allocated to a corresponding terminal, a resource having a stream index of 2 is allocated to the corresponding terminal, and resources are consecutively allocated after the resource having the stream index of 2. In a case where the resource size of a resource that a terminal having a stream index of 2 does not share with a terminal having a stream index of 1 is greater than that of a resource allocated to a corresponding terminal, a resource having a stream index of 1 is allocated to the corresponding terminal, and resources are consecutively allocated after the resource having the stream index of 1 is finally allocated. The resource allocation for the first stream indices of 1 and 2 is started from a resource offset.

Figure 8:
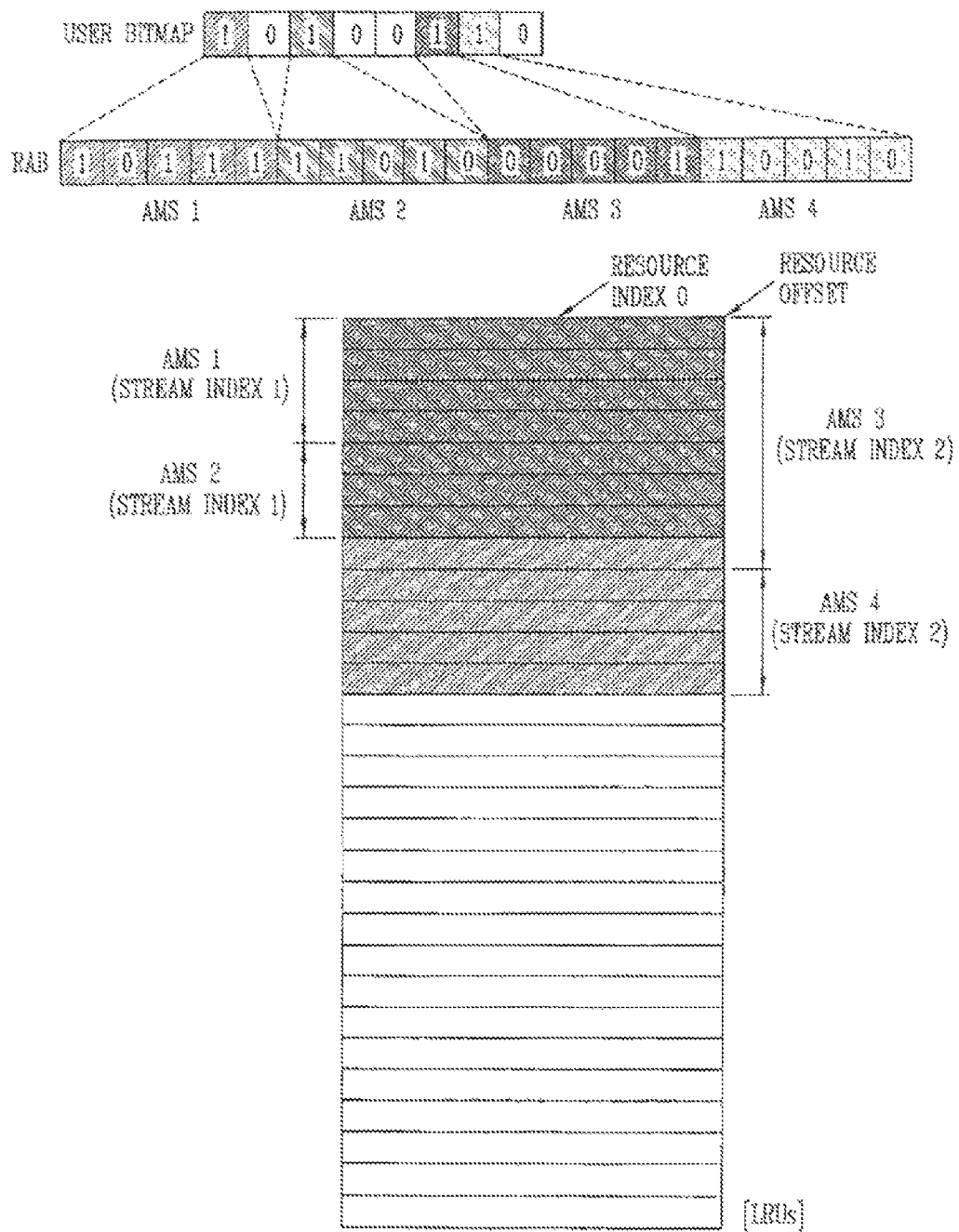
FIG. 8 illustrates a method of allocating a resource to each scheduled terminal in a corresponding group in a GRA method according to Method 5.

FIG. 8 illustrates a method of allocating a resource to each scheduled terminal in a corresponding group in a GRA method according to Method 5.

As shown in FIG. 8, the resource sizes of scheduled terminals (Terminal 1 to 4) in a group are 4, 3, 8 and 4 LRUs, respectively, and the resource offset of the corresponding group is 0.

Referring to FIG. 8, Terminal 1 has a stream index of 1, starting from the resource offset, and receives a resource having resource indices of 0 to 3 LRUs.

Since the resource size of Terminal 2 is smaller than that of Terminal 1, Terminal 2 receives a resource having resource indices of 4 to 6 LRUs after the resource of Terminal 1, and has a stream index of 1.

Since the resource size of Terminal 3 is 8 LRUs greater than the sum of the resource sizes of Terminals 1 and 2, Terminal 3 shares the resource with Terminals 1 and 2. Terminal 3 receives a resource having resource indices of 0 to 7 LRUs, and has a stream index of 2.

Since the resource size (resource index of 7) of a resource that is not shared between Terminals 1 and 2 and Terminal 3 is smaller than that of a resource of Terminal 4, Terminal 4 has a stream index of 2, and receives a resource having resource indices of 8 to 11 LRUs after the resource indices of Terminal 3.

The resources allocated to the scheduled terminals (Terminal 1 to 4) in the specific group according to Method 5 may be rearranged as shown in the following Table 14.

TABLE 14

|  | Resource allocation size | Resource index to be used | Stream index |
|---|---|---|---|
| Terminal 1 | 4 | 0-3 | 1 |
| Terminal 2 | 3 | 4-6 | 1 |
| Terminal 3 | 8 | 0-7 | 2 |
| Terminal 4 | 4 | 8-11 | 2 |
| ... | ... | ... | ... |

<Method 6>
Use of Group Resource in Mode 3 (OL MU-MIMO with Mt=1, TNS=2)

Resource allocation rules according to Method 6 are as follows.

1. A base station allocates, to a first scheduled terminal in a corresponding group, N LRUs corresponding to the resource size of Terminal 1 (i.e., indicated by RAB), starting with a resource offset. In this case, the stream index of Terminal 1 is 1.

2. If the resource size of a scheduled N-th terminal is different from that of a scheduled (N−1)-th terminal, the N-th terminal has a stream index of 1, and the resource of the N-th terminal is allocated next to the resource of the (N−1)-th terminal.

3. If the resource size of a scheduled N-th terminal is identical to that of a scheduled (N−1)-th terminal, and the resource size of the scheduled (N−1)-th terminal is also identical to that of a scheduled (N−1)-th terminal, the N-th terminal has a stream index of 1, and the resource of the N-th terminal is allocated next to the resource of the (N−1)-th terminal.

4. If the resource size of a scheduled N-th terminal is identical to that of a scheduled (N−1)-th terminal, and the resource size of the scheduled (N−1)-th terminal is different from that of the scheduled (N−1)-th terminal, the N-th terminal has a stream index of 2, and the resource of the N-th terminal is shared with the (N−1)-th terminal.

Figure 9:
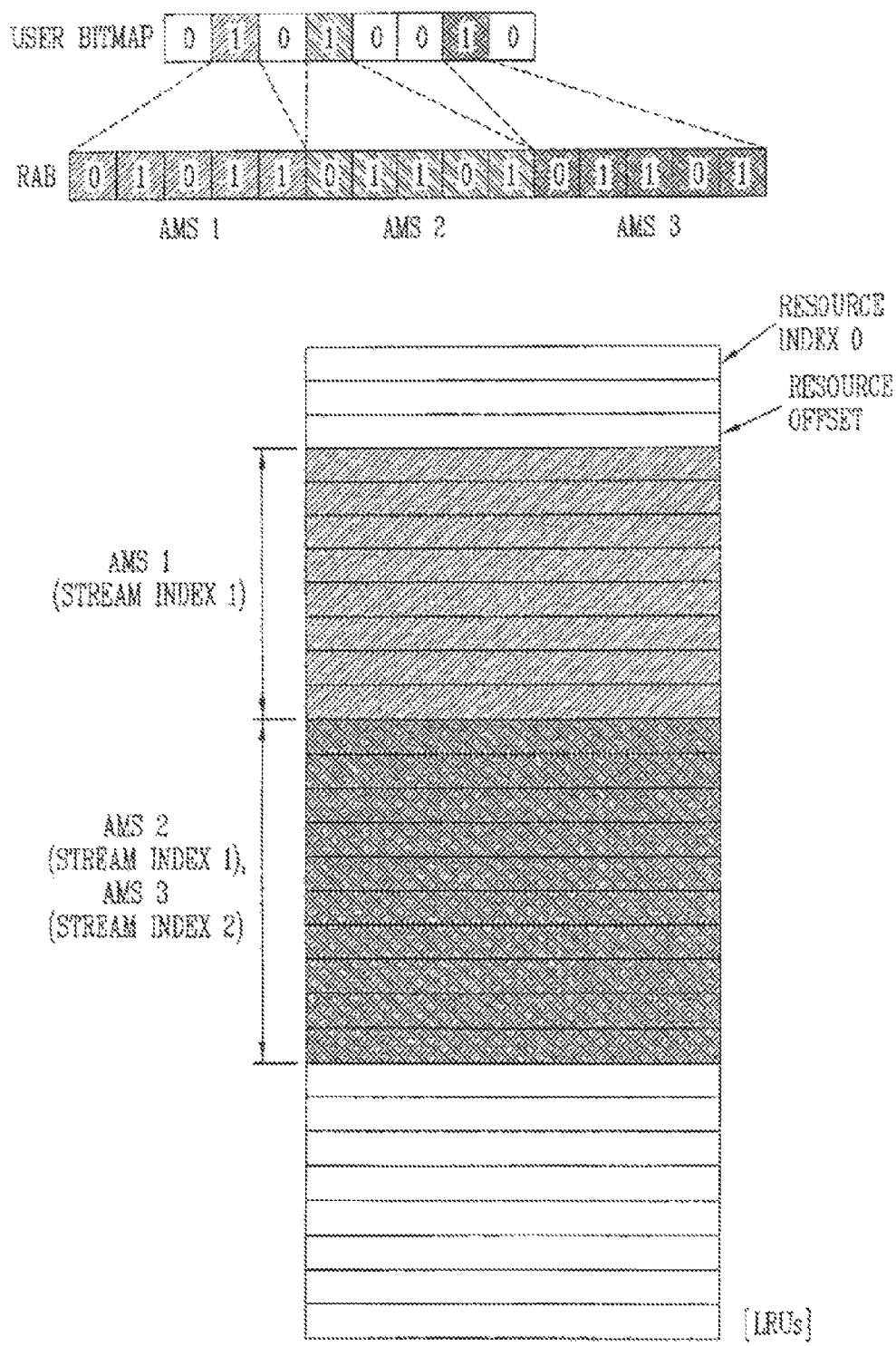
FIG. 9 illustrates a method of allocating a resource to each scheduled terminal in a corresponding group in a GRA method according to Method 6.

FIG. 9 illustrates a method of allocating a resource to each scheduled terminal in a corresponding group in a GRA method according to Method 6.

As shown in FIG. 9, it can be seen that the resource offset is 3, and the resource sizes of terminals are 8, 10 and 10 LRUs, respectively.

First, Terminal 1 receives a resource having resource indices of 3 to 10 LRUs, starting from the resource offset, and has a stream index of 1.

Since the resource size of Terminal 2 is greater than that of Terminal 1, Terminal 2 receives a resource having resource indices of 11 to 20 LRUs next to the resource indices of the resource allocated to Terminal 1, and has a stream index of 1.

Since the resource size of Terminal 3 is identical to that of Terminal 2 and different from that of Terminal 1, Terminal 3 has a stream index of 2 and shares the resource with Terminal 2 according to Method 6. That is, Terminal 3 receives a resource having resource indices of 11 to 20 LRUs.

<Method 7>: Explicit Method—Use of PSI (Pilot Stream Index) Bitmap

Method 7 is a method of explicitly allocating resources to terminals using a PSI bitmap when the UL MIMO Mode set is an OL MU MU-MIMO Mode having Mt=1 and TNS=2 in GRA.

First, terminals contained in a predetermined group receive a group configuration MAC control message from a base station. The group configuration MAC control message refers to a message transmitted from the base station so as to inform the terminals that a terminal is added or deleted in the corresponding group.

The group configuration MAC control message contains an MIMO mode set field that indicates a DL/UL MIMO mode of the corresponding group. The MIMO Mode set field may have a size of 2 bits.

Next, the base station may allocate resources to users in one group. In order to allocate resources one or more users in the one group, the base station transmits DL/UL GRA A-MAP IE to the terminals.

The DL/UL GRA A-MAP IE is contained in user-specific resource allocation information in an A-MAP region. The GRA A-MAP IE contains bitmaps that represent scheduled users or signals MIMO modes, HARQ burst sizes and resource sizes.

In a case where the MIMO Mode set of the corresponding group is set to '0b11' or '0b10' (i.e., MIMO Mode 3: OL MU-MIMO Mode with Mt=1 and TNS=2), the terminal can identify a stream index allocated to scheduled terminals in the corresponding group from the base station, through MIMO bitmap information contained in the GRA A-MAP IE.

Here, a PSI bitmap indicating the allocated stream indices to the scheduled terminals in the corresponding group may be contained in the GRA A-MAP IE so as to be transmitted to the terminals.

For example, in a case where the bit of the MIMO bitmap is set to '0,' the bit of the PSI bitmap indicates '0.' In a case where the bit of the PSI bitmap is set to '0,' the stream index allocated to the terminals may be '1.'

In a case where the bit of the MIMO bitmap is set to '1,' the bit of the PSI bitmap indicates '1.' In a case where, the bit of the PSI bitmap is set to '1,' the stream index allocated to the terminals may be '2.' Similarly, the stream index may be '1.'

That is, in a case where the allocated stream indices are different, a terminal shares the resource with terminals scheduled before or after a resource is allocated to the terminal.

That is, in the case of OL MU-MIMO mode, the GRA A-MAP IE has a PSI bitmap for a corresponding MIMO mode, and the size of the PSI bitmap is identical to that of the user bitmap of which bit is set to '1.'

Here, the PSI bitmap may be separately added to the GRA A-MAP IE, and may be expressed through the MIMO bitmap as described above.

That is, in a case where the UL MIMO Mode set is set to Mode 3, the terminal can identify stream indices allocated to the terminals through the MIMO bitmap contained in the GRA A-MAP IE as described above.

In this case, '0' in the PSI bitmap denotes a steam index of 1, and a new resource is allocated next to the resource corresponding to the last stream index of 1. '1' in the PSI bitmap indicates that a terminal shares a resource with the previous terminal having a stream index of 1, and the corresponding terminal has a stream index of 2.

That is, the PSI bitmap indicates how the terminals included in a group share resource and which stream index each terminal has.

If the first bit of the PSI bitmap starts from '1,' the opposite operation to that described above is performed.

The following Table 15 shows an example of the format of the GRA A-MAP IE containing the PSI bitmap when the UL MIMO Mode set is set to Mode 3 according to an embodiment of the present disclosure.

TABLE 15

| Syntax | Size (bit) | Description/Notes |
| --- | --- | --- |
| ... | ... | ... |
| if(Group MIMO mode set ==0b01){ | | |
| MIMO Bitmap | Variable | Bitmap to indicate MIMO mode for the scheduled AMSs<br>0b0: Mode 0<br>0b1: Mode 1 |
| } | | |

TABLE 15-continued

| Syntax | Size (bit) | Description/Notes |
|---|---|---|
| if(Group MIMO mode set ==0b11){ | | |
| PSI Bitmap | Variable | Bitmap to indicate PSI (Pilot stream index) for the scheduled AMSs<br>0b0: PSI = 0<br>0b1: PSI = 1 |
| } | | |
| Resource Allocation Bitmap | Variable | Bitmap to indicate burst size/ resource size for each scheduled AMS |
| } | | |

The following Table 16 shows an example of the format of the GRA A-MAP IE according to another embodiment of the present disclosure.

TABLE 16

| Syntax | Size (bit) | Description/Notes |
|---|---|---|
| ... | ... | ... |
| if(Group MIMO mode set ==0b01 || 0b11){ | | |
| MIMO Bitmap | Variable | If Group MIMO mode set is 0b01, then the MIMO Bitmap is Bitmap to indicate MIMO mode for the scheduled AMSs<br>0b0: Mode 0<br>0b1: Mode 1<br>If Group MIMO mode set is 0b01, then the MIMO Bitmap is Bitmap to indicate PSI (Pilot stream index) for the scheduled AMSs<br>0b0: PSI = 0<br>0b1: PSI = 1 |
| } | | |
| Resource Allocation Bitmap | Variable | Bitmap to indicate burst size/ resource size for each scheduled AMS |
| } | | |

Figure 10:
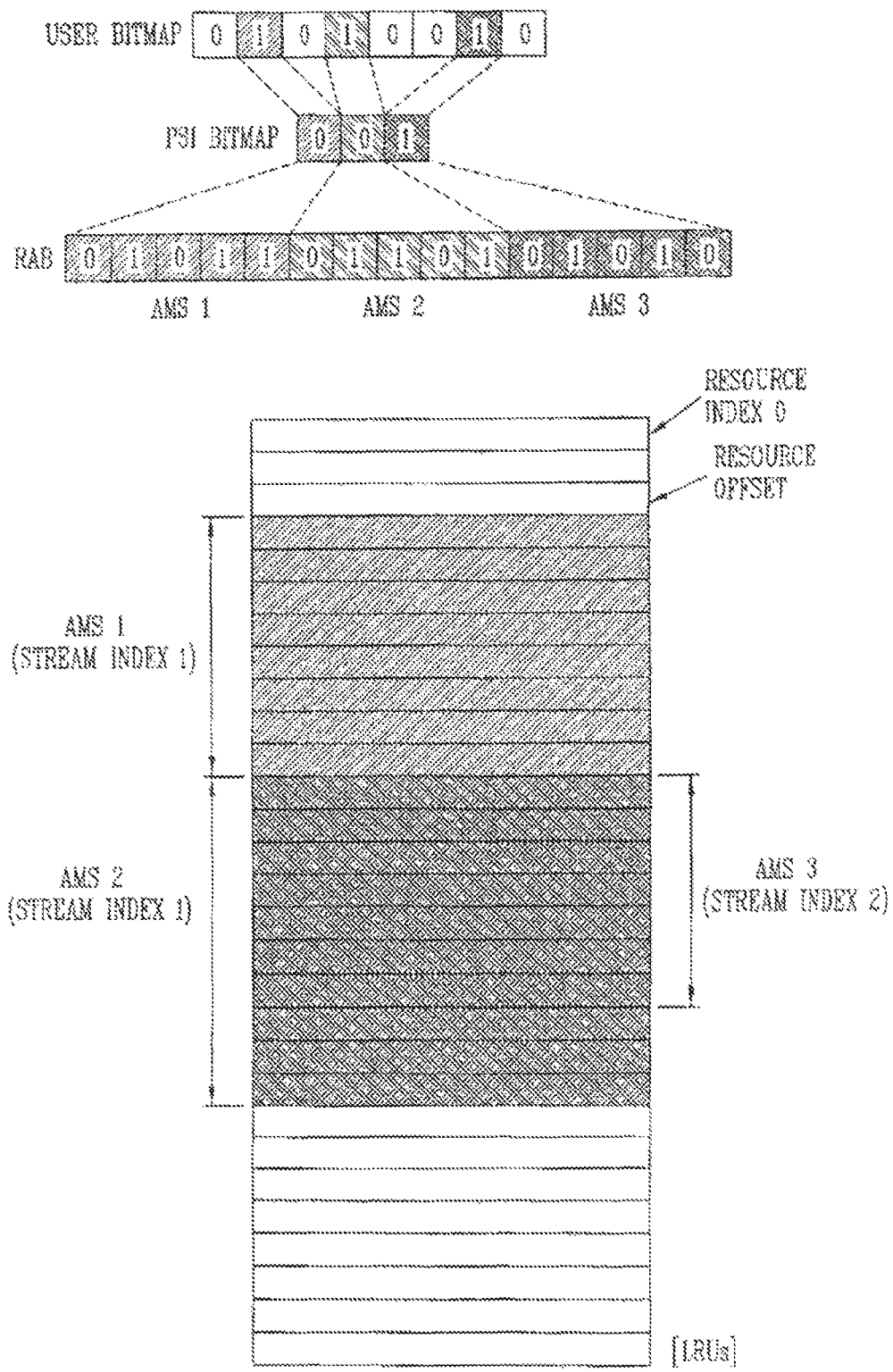
FIG. 10 illustrates a method of allocating a resource to each scheduled terminal in a corresponding group in a GRA method according to Method 7.

FIG. 10 illustrates a method of allocating a resource to each scheduled terminal in a corresponding group in a GRA method according to Method 7.

As shown in FIG. 10, the resources sizes of scheduled terminals (Terminal 1 to 3) are 8, 10 and 7 LRUs, respectively, and the PSI bitmap allocated to the scheduled terminals has 3 bits of '001.'

The resource size of Terminal 1 is 8 LRUs, and the bit corresponding to Terminal 1 in the PSI bitmap is set to '0.' Hence, Terminal 1 receives a resource having resource indices of 3 to 10 LRUs, starting from the resource offset, and has a stream index of 1. Here, the size of the resource allocated to the terminal refers to the number of LRUs.

Next, the resource size of Terminal 2 is 10 LRUs, and the bit corresponding to Terminal 2 in the PSI bitmap is set to '0.' Hence, Terminal 2 does not share the resource with Terminal 1, and receives a new resource having resource indices of 11 to 20 LRUs. Terminal 2 has a stream index of 1.

Next, the resource size of Terminal 3 is 7 LRUs, and the bit corresponding to Terminal 3 in the PSI bitmap is set to '1.' Hence, Terminal 3 shares the resource with Terminal 2. That is, Terminal 3 receives a resource having resource indices of 11 to 17 LRUs, and has a stream index of 2. Here, Terminal 3 shares the resource with the previously scheduled Terminal 2.

The resource indices and stream indices allocated to the scheduled terminals (Terminals 1 to 3) according to Method 7 are rearranged as shown in the following Table 17.

TABLE 17

| | Resource allocation size | Resource index to be used | Stream index |
|---|---|---|---|
| Terminal 1 | 8 | 3-10 | 1 |
| Terminal 2 | 10 | 11-20 | 1 |
| Terminal 3 | 7 | 11-17 | 2 |

<Method 8>

Method 8 is another resource allocation method using the PSI bitmap. A method in which terminals respectively corresponding to a first bit of 0 and a first bit of 1 receive resources, starting from the resource offset (i.e., a method in which a terminal having a first stream index of 2 shares a resource with a terminal having an initial stream index of 1), will be described.

Figure 11:
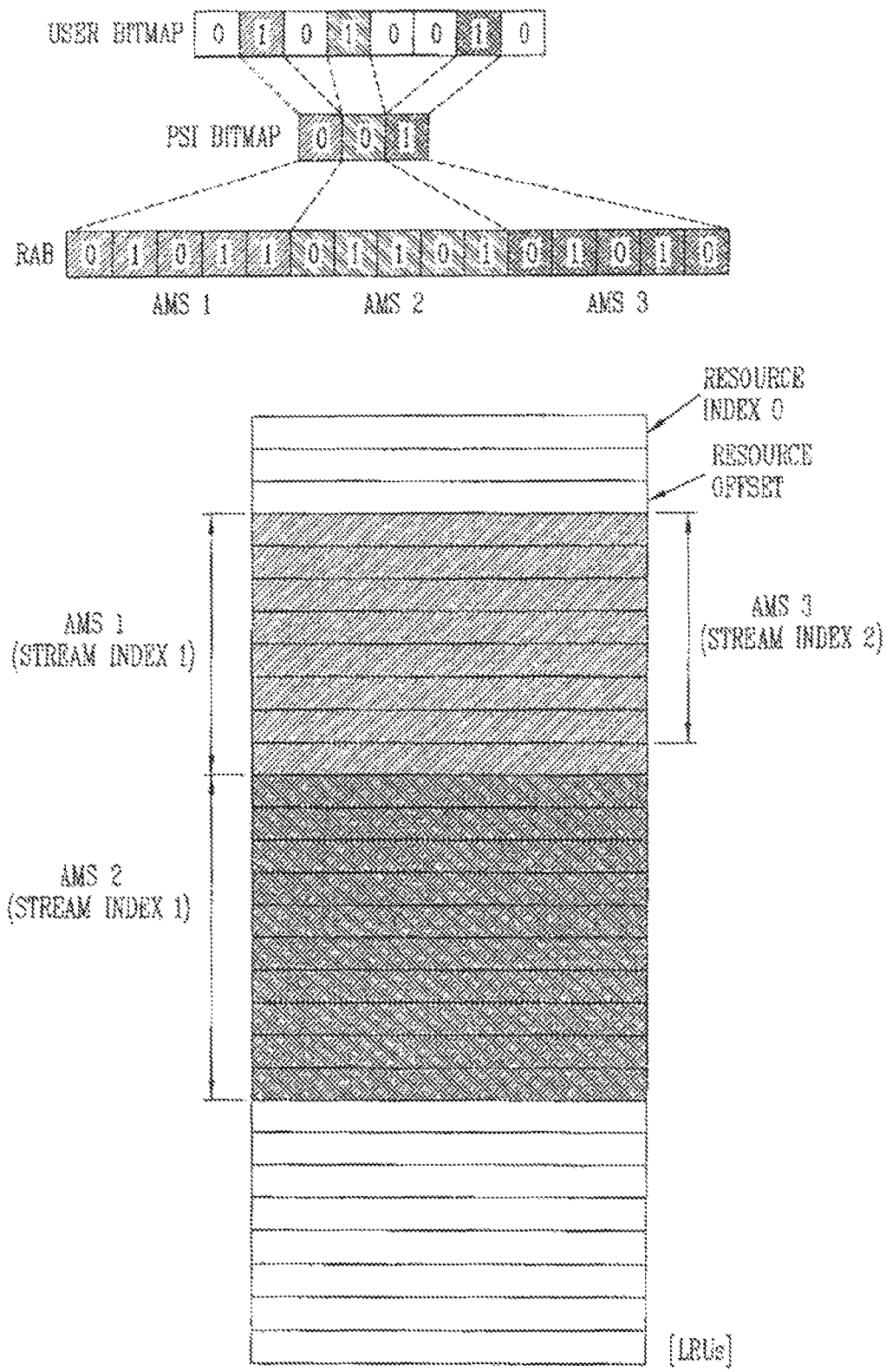
FIG. 11 is a diagram illustrating a GRA method according to Method 8.

FIG. 11 is a diagram illustrating a GRA method according to Method 8.

Referring to FIG. 11, like Method 7, the sizes of resources allocated to terminals are 8, 10 and 7 LRUs, respectively, and the PSI bitmap corresponding to the terminals has 3 bits of '001.'

The resource allocation of Terminals 1 and 2 is the same as Method 7.

The bit corresponding to Terminal 3 in the PSI bitmap is set to '1.' Therefore, according to Method 8, Terminal 3 must share the resource with the terminal (Terminal 1) having an initial stream index of 1.

Thus, Terminal 3 receives a resource having resource indices of 3 to 9 LRUs, starting from the resource offset, and has a stream index of 2.

The resource indices and stream indices allocated to the scheduled terminals (Terminals 1 to 3) according to Method 8 are rearranged as shown in the following Table 18.

TABLE 18

| | Resource allocation size | Resource index to be used | Stream index |
|---|---|---|---|
| Terminal 1 | 8 | 3-10 | 1 |
| Terminal 2 | 10 | 11-20 | 1 |
| Terminal 3 | 7 | 3-9 | 2 |

Figure 12:
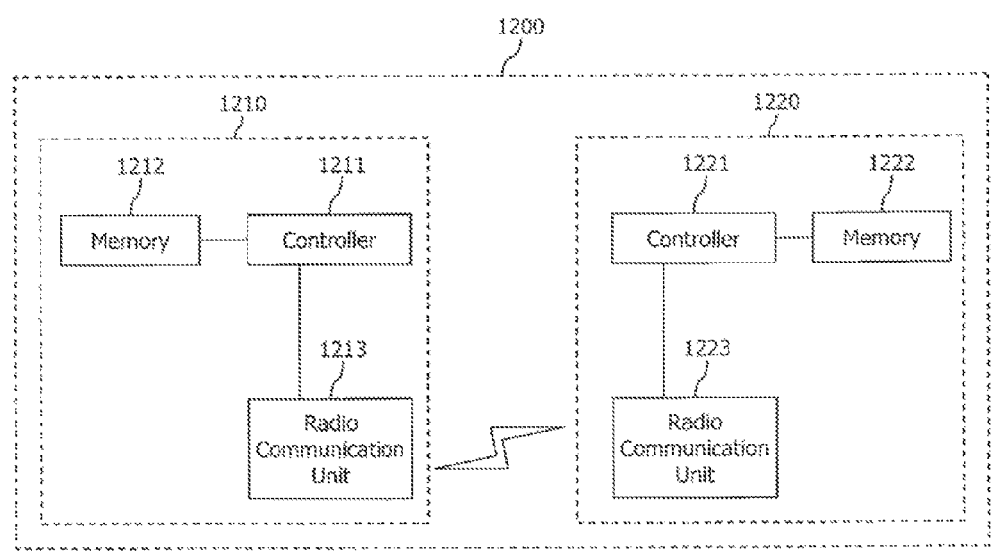
FIG. 12 is a block diagram illustrating a wireless communication system according to an embodiment of the present disclosure.

FIG. 12 is a block diagram illustrating a wireless communication system according to an embodiment of the present disclosure.

A base station 1210 includes a control unit 1211, a memory 1212 and a radio frequency (RF) unit 1213.

The control unit 1211 implements a proposed function, procedure and/or method. The layers of the radio interface protocol may be implemented by the control unit 1211.

The control 1211 may operate OL MU-MIMO mode as MIMO mode in GRA, and may control the base station to allocate different stream indices to scheduled terminals in a corresponding group.

The memory 1212 is connected to the control unit 1211 so as to store protocols or parameters for the OL MU-MIMO mode as the MIMO mode in the GRA. The RF unit 1213 is connected to the control unit 1211 so as to transmit and/or receive a radio signal.

The terminal 1220 includes a control unit 1221, a memory 1222 and a radio frequency (RF) unit 1223.

The control unit 1221 implements a proposed function, procedure and/or method. The layers of the radio interface protocol may be implemented by the control unit 1221. The control unit 1221 may operate OL MU-MIMO mode as MIMO mode in GRA, and may control the base station to allocate different stream indices to scheduled terminals in a corresponding group.

The memory 1212 is connected to the control unit 1221 so as to store protocols or parameters for the OL MU-MIMO mode as the MIMO mode in the GRA. The RF unit 1223 is connected to the control unit 1221 so as to transmit and/or receive a radio signal.

The control unit 1211 or 1221 may include an application-specific integrated circuit (ASIC), a chip set, a logical circuit and/or a data processing device. The memory 1212 or 1222 may include a read-only memory (ROM), a random access memory (RAM), a flash memory, a memory card, a storage medium and/or a storage device. The RF unit 1213 or 1223 may include a baseband circuit for processing a radio signal. When the embodiment is implemented using software, the aforementioned technique may be implemented using a module (process, function, etc.) performing the aforementioned functions. The module may be stored in the memory 1212 or 1222, and may be executed by the control unit 1211 or 1221. The memory 1212 or 1222 may exist inside or outside the control unit 1211 or 1221, and may be connected to the control unit 1211 or 1221 using various well-known means.

The invention claimed is:

1. A method for uplink transmission in a wireless access system, the method comprising:
   receiving, by a terminal from a base station, a group configuration message including a multi-input multi-output (MIMO) mode set identifier (ID), the MIMO mode set ID indicating a MIMO mode set for a group in which the terminal is included, the group transmitting uplink data with open-loop (OL) multi-user (MU)-MUMO;
   receiving, by the terminal from the base station, a resource allocation message including a user bitmap, a resource offset and a resource allocation bitmap, the user bitmap indicating scheduled terminals in the group, the resource offset indicating a starting logical resource unit (LRU) for resource assignment to the group, and the resource allocation bitmap indicating a burst size and a resource size for each of the scheduled terminals; and
   transmitting, by the terminal to the base station, uplink data through resources signaled by the resource allocation message.

2. The method of claim 1, wherein the resource allocation message is a group resource allocation (GRA) advanced-map (A-MAP) information element (IE).

3. The method of claim 1, wherein the resource allocation message includes a pilot stream index (PSI) bitmap indicating a stream index for each of the scheduled terminals.

4. The method of claim 3, wherein the uplink data are allocated to contiguous resources in increasing order of indices based on the stream index.

5. The method of claim 3, wherein a size of the PSI bitmap is equal to a number of bits set to 1 in the user bitmap.

6. The method of claim 1, wherein a number of MIMO streams of the terminal is set to 1 and a total number of streams in the group is set to 2.

7. A terminal in a wireless access system, the terminal comprising:
   a radio frequency (RF) unit configured to transmit and receive a radio signal; and
   a control unit operatively connected to the RF unit and configured for:
   receiving, from a base station, a group configuration message including a multi-input multi-output (MIMO) mode set identifier (ID), the MIMO mode set ID indicating a MIMO mode set for a group in which the terminal is included, the group transmitting uplink data with open-loop (OL) multi-user (MU)-MUMO;
   receiving, from the base station, a resource allocation message including a user bitmap, a resource offset and a resource allocation bitmap, the user bitmap indicating scheduled terminals in the group, the resource offset indicating a starting logical resource unit (LRU) for resource assignment to the group, and the resource allocation bitmap indicating a burst size and a resource size for each of the scheduled terminals; and
   transmitting, to the base station, uplink data through resources signaled by the resource allocation message.

8. The terminal of claim 7, wherein the resource allocation message includes a pilot stream index (PSI) bitmap indicating a stream index for each of the scheduled terminals.

9. The terminal of claim 8, wherein the uplink data are allocated to contiguous resources in increasing order of indices based on the stream index.

10. The terminal of claim 7, wherein a number of MIMO streams of the terminal is set to 1 and a total number of streams in the group is set to 2.

11. A base station in a wireless access system, the base station comprising:
    a radio frequency (RF) unit configured to transmit and receive a radio signal; and
    a control unit operatively connected to the RF unit and configured for:
    transmitting, to a terminal, a group configuration message including a multi-input multi-output (MIMO) mode set identifier (ID), the MIMO mode set ID indicating MIMO mode set for a group in which the terminal is included, the group transmitting uplink data with open-loop (OL) multi-user (MU)-MUMO; and
    transmitting, to the terminal, a resource allocation message including a user bitmap, a resource offset and a resource allocation bitmap, the user bitmap indicating scheduled terminals in the group, the resource offset indicating a starting logical resource unit (LRU) for resource assignment to the group, and the resource allocation bitmap indicating a burst size and a resource size for each of the scheduled terminals.

12. The base station of claim 11, wherein the resource allocation message includes a pilot stream index (PSI) bitmap indicating a stream index for each of the scheduled terminals.

13. The base station of claim 11, wherein a number of MIMO streams of the terminal is set to 1 and a total number of streams in the group is set to 2.

\* \* \* \* \*